US005458717A

United States Patent [19]

Kurita

[11] Patent Number: 5,458,717

[45] Date of Patent: Oct. 17, 1995

[54] METHOD OF SHEARING THIN METAL SHEET

[75] Inventor: Mikiya Kurita, Nagoya, Japan

[73] Assignee: Nippondenso Co., Ltd., Kariya, Japan

[21] Appl. No.: 171,457

[22] Filed: Dec. 22, 1993

[30] Foreign Application Priority Data

Dec. 24, 1992 [JP] Japan .................................... 4-344519

[51] Int. Cl.[6] ............................ B32B 31/18; B26D 3/00; B26F 1/14

[52] U.S. Cl. ............................. 156/253; 156/250; 83/31; 83/55; 83/681; 83/685; 83/686; 83/690; 72/326; 72/330; 72/338; 29/17.1; 29/17.2

[58] Field of Search .................................... 156/261, 510, 156/253; 29/17.1, 893.33, 893.34, 34 R; 72/325, 330, 338; 83/30, 31, 55, 681, 682, 684, 685, 686, 690, 744

[56] References Cited

U.S. PATENT DOCUMENTS

| | | | |
|---|---|---|---|
| 1,506,480 | 8/1924 | Grade | 83/685 |
| 2,404,793 | 7/1946 | Dickerman | 83/690 |
| 4,060,017 | 11/1977 | Backlund | 83/31 X |
| 4,579,022 | 4/1986 | Kasai et al. | 156/645 X |
| 4,586,360 | 5/1986 | Jürgensmeyer et al. | 29/893.33 X |
| 5,235,881 | 8/1993 | Sano et al. | 83/685 X |

FOREIGN PATENT DOCUMENTS

| | | |
|---|---|---|
| 1293922 | 11/1989 | Japan . |
| 2127997 | 5/1990 | Japan . |
| 3234321 | 10/1991 | Japan . |
| 4146100 | 5/1992 | Japan . |
| 4146099 | 5/1992 | Japan . |

*Primary Examiner*—David A. Simmons
*Assistant Examiner*—M. Curtis Mayes
*Attorney, Agent, or Firm*—Cushman, Darby & Cushman

[57] ABSTRACT

A method of shearing a thin metal sheet having a thickness of approximately 0.1 mm or less so as to be separated into a product and scrap by a pair of dies. A chamfer or a round having a size of approximately from 5 to 10 times greater than the thickness of the thin metal sheet is arranged at the lip of a first die which presses one portion of the thin metal sheet which is to be scrap. A chamfer or a round is not substantially arranged at the lip of a second die which presses the other portion of the thin metal sheet which is to be a product. A backing material and the thin metal sheet are overlapped so as to be a laminate. The backing material has a thickness of approximately 2 times or more greater than that of the thin metal sheet and is formed of a flexible material having a very small elongation and is soft enough not to substantially prevent the thin metal sheet from being sheared, such as, for example, paper. The laminate is arranged such that the backing material faces the pressing surface of the first die and that the thin metal sheet faces the pressing surface of the second die. Then, the thin metal sheet and the backing material are sheared concurrently. Thus, the thin metal sheet can be sheared, by methods such as blanking and piercing, while inhibiting burring, without requiring any special type of device or blanking die.

3 Claims, 2 Drawing Sheets

| | |
|---|---|
| MATERIAL TO BE WORKED | : SUS304-3/4H |
| THICKNESS OF A SHEET | : 20μm |

METHOD OF SHEARING THIN METAL SHEET

BACKGROUND OF THE INVENTION

1. Field of the Invention

The present invention relates to a method of shearing, such as blanking and piercing, a thin metal sheet.

2. Description of the Related Art

For example, when a thin metal sheet is blanked, it is necessary to restrict the ratio of the clearance between dies to the thickness of the sheet to a predetermined value or less in conventional blanking methods in order to inhibit a blanking burr. However, when the thickness of a sheet is 0.1 mm or less, that is, approximately dozens of μm or less, it is difficult to ensure the above ratio in terms of precision, particularly when a thin metal sheet is blanked by a complicatedly-shaped die. As a result, a great deal of labor and cost are required to produce and maintain the die device.

Methods of inhibiting a blanking burr are known such as a blanking method by using upper and lower blanking dies and a burr-free blanking method (Japanese Patent Laid-Open Nos. 1-293922, 3-234321 and 4-146100). They present, however, the following problems when applied to a thin sheet described above. The former method requires a special type of device (Japanese Patent Laid-Open No. 2-127997), whereas the latter method is difficult to be applied to a thin sheet.

As stated above, in the conventional methods, it is hard to blank a thin metal sheet having a thickness of approximately 0.1 mm or less while inhibiting burring without using any special type of device or blanking die.

SUMMARY OF THE INVENTION

Accordingly, an object of the present invention is to provide a method of shearing, for example, blanking and piercing, a thin metal sheet having a thickness of approximately 0.1 mm or less while inhibiting burring, without requiring any special type of device or blanking die.

In order to achieve the above object, the present invention provides a method of shearing a thin metal sheet having a thickness of approximately 0.1 mm or less so as to be separated into a product and scrap by a pair of dies, the method comprising the steps of: preparing the lip of a first die to be chamfered or rounded, the size of a chamfer or a round being approximately from 5 to 10 times greater than the thickness of the thin metal sheet, the first die pressing one portion of the thin metal sheet which is to be scrap, and preparing the lip of a second die substantially free of a chamfer or a round, the second die pressing the other portion of the thin metal sheet which is to be a product; laminating the thin metal sheet and a backing material having a thickness of approximately 2 times or more greater than that of the thin metal sheet and formed of a flexible material having a very small elongation and is soft enough not to substantially prevent the thin metal sheet from being sheared, such as, for example, paper; arranging the laminate such that the backing material faces the pressing surface of the first die and that the thin metal sheet faces the pressing surface of the second die; and shearing the thin metal sheet and the backing material concurrently.

In the method of the present invention, a portion of a thin metal sheet to be scrapped is tension-deformed along a chamfer or a round of the lip of the first die and pressed to the lip substantially free of a chamfer or a round of the second die, and thus, the thin metal sheet is torn off at the biting portion of the second lip so as to be separated. Consequently, since the thin metal sheet is always separated in the position closely adjacent to the lip of the second die regardless of a clearance between the first and second dies, it can be sheared substantially free from a burr.

A chamfer or a round is arranged on the lip of the first die which presses the portion of the thin metal sheet to be scrapped in order to apply the tensile force required for the separation to the thin metal sheet. A suitable range of the chamfer or round is approximately from 5 to 10 times greater than the thickness of the thin metal sheet. If the chamfer or round is less than this range, a sufficient tensile force is not produced, thus failing to achieve the reliable effect of inhibiting a burr. Conversely, if the chamfer or round is more than this range, a tensile force adversely influences the resulting product which is likely to be deformed.

The sheet-like backing material sheared concurrently with the thin metal sheet serves the function of pressing the thin metal sheet to the lip of the second die under the influence of the above tensile force. As a sheet-like backing material, it is suitable to use a flexible material which has a thickness approximately 2 times or more greater than the thin metal sheet, has a very small elongation and is easily cut, such as, for example, paper.

The method of the present invention is particularly advantageous when it is applied to a thin metal sheet having a thickness of approximately 0.1 mm or less which is difficult to be sheared without producing a burr according to the conventional methods.

DESCRIPTION OF THE PREFERRED EMBODIMENTS

An embodiment will be given with reference to the accompanying drawings in order to explain the present invention in more detail.

FIG. 1 shows a typical example of arranging a blanking device according to the method of the present invention.

Figure 1A:
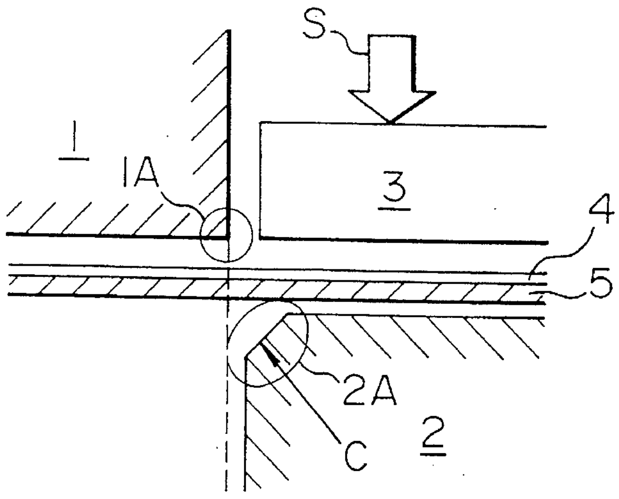
FIGS. 1A, 1B and 1C are sectional views showing the operational modes of a device for blanking a thin metal sheet in sequential steps according to the present invention.
Figure 1B:
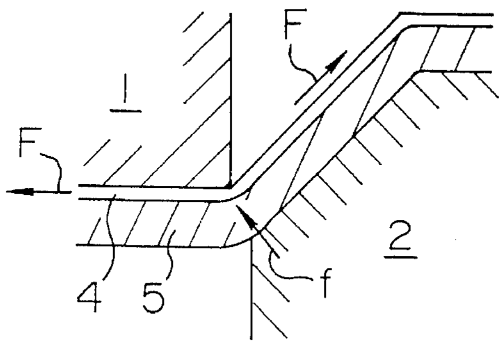
Figure 1C:
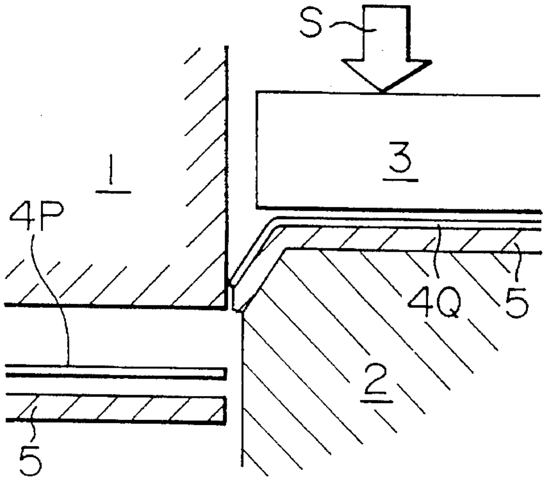

FIGS. 1A, 1B and 1C indicate operational modes before the blanking process, during the blanking process and after the blanking process, respectively. The device for blanking a thin metal sheet 4 as a material to be blanked includes a punch 1, a die member 2 and a material pressing member 3 (pressing force S). A backing material 5 is blanked together with the thin metal sheet 4. A chamfer or a round is arranged at a lip 2A of the die member 2 adjacent to a portion of the thin metal sheet 4 to be scrapped. The backing material 5 is disposed between the die member 2 and the thin metal sheet 4. The device used in the present invention is constructed in a manner similar to an ordinary press-blanking device, except that the lip 2A of the die member 2 is chamfered or rounded and that the backing material 5 is used in the former device.

According to the method used in the present invention, the device and the thin metal sheet are first arranged as illustrated in FIG. 1A. As shown in FIG. 1B, in the process of working, the thin metal sheet 4 is subjected to the tensile force F along the die member 2 so as to be tension-deformed and pressed to the lip 1A of the punch 1 by the application of the pressing force F via the backing material 5. As illustrated in FIG. 1*c*, the thin metal sheet 4 is then torn off in the neighborhood of the substantially non-chambered or unrounded lip 1A so that they are separated into a product 4P and scrap 4Q. The material pressing member 3 serves the function of restraining the thin metal sheet 4 in order to ensure the tensile force F required for tearing off the thin metal sheet 4. A material to be relatively easily cut and have a very small elongation, for example, a sheet of paper, is used as the backing material 5.

Blanking work of the present invention was carried out, by way of example, by using the device shown in FIG. 1 under the following conditions. SUS304-3/4H having a thickness of 20 μm was used as a material to be worked 4. Medium-grade paper having a thickness of approximately 80 μm was used as the sheet-like backing material 5. The clearance between the dies was determined as from 50 to 100% of a metal sheet thickness of 20 μm. The amount C in which the lip 2A of the die member 2 was chamfered or rounded was determined as from 0.1 to 0.2 mm. The force of pressing the material 4 was set from 60 to 150% of the blanking force.

For the purpose of the comparison, blanking work was carried out according to a conventional method under conditions similar to those in the above embodiment, except that the lip 2A of the die member 2 was neither chamfered nor rounded, and that the backing material 5 was not used.

Figure 2:
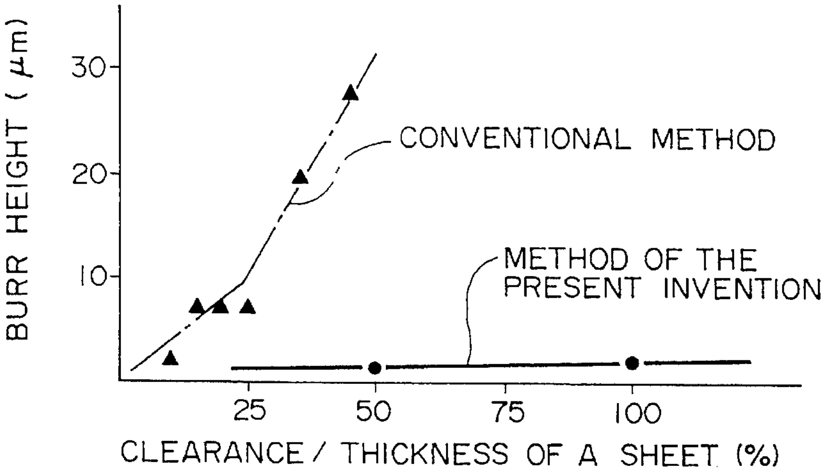
FIG. 2 is a graph indicating the relationship between the height of a burr produced by blanking SUS304 thin sheet and the clearance between the dies according to the conventional method and the method of the present invention.

FIG. 2 indicates the relationship between the burr height and the clearance/the thickness of a sheet, thereby showing the results of blanking the foregoing two shearing operations. As will be seen from FIG. 2, in the blanking work according to the conventional method, as the clearance/the thickness of a sheet increases, the burr height distinctly soars. On the other hand, in the blanking work according to the method of the present invention, the burr height is significantly restrained to a small degree even though the clearance/the thickness of a sheet is 100%.

Also, in the conventional method, the life of the blanking die greatly depends upon the clearance and the sharpness of the lip. Thus, the smaller the thickness of a material to be blanked, the less reliable the life of the blanking die. As a result, a great deal of labor is required to produce and control the blanking die for maintenance. On the other hand, in the method of the present invention, the life of the blanking die hardly relies upon the clearance and the sharpness of the lip so that it can be reliably ensured, free from the above problems.

SUS304 was used as the material to be blanked in the present embodiment. However, thin metal sheets formed of other kinds of materials, such as stainless, copper, aluminium, may be applied to a material to be blanked, and advantages similar to those in the present embodiment can be obtained.

Although the medium-grade paper having a thickness of approximately 80 μm was used as the sheet-like backing material, almost all kinds of ordinary paper may be used as the backing material so long as they have the characteristics described above. Further, the backing material is not limited to paper, a material having the characteristics equivalent to the paper may certainly be used.

The blanking die is not restricted as long as it satisfies the conditions set for the present invention. For example, as illustrated in FIG. 3 by way of example, an ordinary movable stripper-type die device can be attached to a general pressing apparatus for use.

Figure 3:
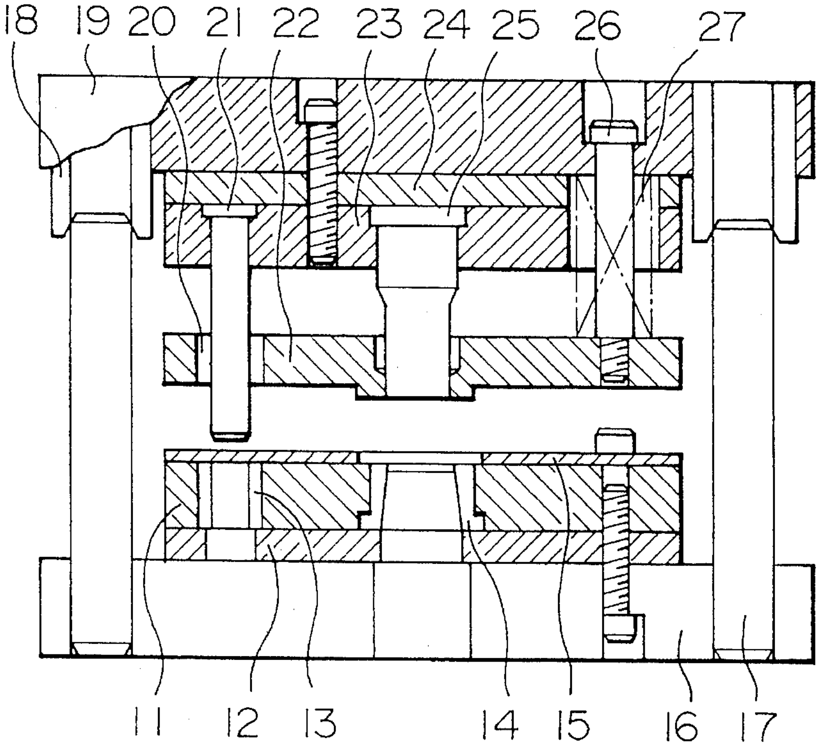
FIG. 3 is a sectional view showing one example of the construction of a blanking device used to embody the present invention.

Referring to FIG. 3, the die device includes a die plate 11, a backing plate 12, a stripper guide bush 13, a button die 14, a location plate 15, a die holder 16, a guide post 17, a guide bush 18, a punch holder 19, a stripper guide bush 20, a stripper guide pin 21, a stripper plate 22, a punch plate 23, a backing plate 24, a punch 25, a stripper bolt 26 and a spring 27.

The blanking work was performed in the present embodiment by way of example. When the present embodiment is applied to other kinds of shearing work, for example, piercing work, advantages similar to those in the present embodiment can be obtained. No matter what kind of mode of working, it is necessary to consider the arrangement and the configuration of the material pressing member and its pressing force in order to ensure that the material to be worked generates a sufficient tensile force but that the resultant product is not deformed due to the tensile force.

As will be clearly understood from the foregoing description, the present invention offers the following advantages.

A thin metal sheet having a thickness of approximately 0.1 mm or less can be shearing-worked, for example, blanking and piercing work, while inhibiting burring, without requiring any special type of device or blanking die.

What is claimed is:

1. A method of shearing a thin metal sheet so as to be separated into a product and scrap by a pair of dies, said dies including a first die having a chamfered or rounded lip and a second die having a non-chamfered or unrounded lip, said method comprising the steps of:

arranging between said lips of said first and second dies a thin metal sheet having a thickness less than 0.1 mm;

disposing paper between said thin metal sheet and said lip of said first die, said paper not substantially preventing said thin metal sheet from being sheared; and shearing said thin metal sheet and said paper by said pair of dies, wherein said paper has a thickness of two times or more greater than a thickness of said thin metal sheet.

2. A method of shearing a thin metal sheet according to claim 1, wherein said shearing by said pair of dies includes bringing said paper into press-contact with the lip of said first die to apply a tensile force to the thin metal sheet for preventing generation of a blanking burr.

3. A method of shearing a thin metal sheet so as to be separated into a product and scrap by a pair of dies, said dies including a first die having a chamfered or rounded lip and a second die having a non-chamfered or unrounded lip, said method comprising the steps of:

arranging between said lips of said first and second dies a thin metal sheet having a thickness less than 0.1 mm;

disposing paper between said thin metal sheet and said lip of said first die, said paper not substantially preventing said thin metal sheet from being sheared; and shearing said thin metal sheet and said paper by said pair of dies, said first die having a length of said chamfered or rounded lip approximately five to ten times larger than a thickness of said metal sheet.

* * * * *